Sept. 15, 1964  H. A. NEUSTAEDTER  3,149,190
LEAD SMELTING

Filed Aug. 16, 1962  8 Sheets-Sheet 1

FIG.1

INVENTOR:
HAROLD A. NEUSTAEDTER
BY
ATTORNEYS.

Sept. 15, 1964 H. A. NEUSTAEDTER 3,149,190
LEAD SMELTING
Filed Aug. 16, 1962 8 Sheets-Sheet 8

INVENTOR:
HAROLD A. NEUSTAEDTER
BY
ATTORNEYS.

3,149,190
LEAD SMELTING
Harold A. Neustaedter, 5635 Eichelberger, St. Louis, Mo.
Filed Aug. 16, 1962, Ser. No. 217,440
11 Claims. (Cl. 266—10)

This invention relates to lead smelting units, particularly of the ore hearth type.

Very little progress toward mechanization of ore hearth smelters has been made since the Newnam automatic rabbler and automatic backing shovel were introduced thirty years ago or more. In those plants in which the ore hearth is still used, the ore is thrown on the hearth manually, the molten lead is tapped off manually, the operation is by no means uniform, and the labor costs are relatively high.

One of the objects of this invention is to provide an ore hearth which is substantially automatic in its operation, produces uniform results, is more efficient than the ore hearths known heretofore, requires little manual labor, and uses less carbon for a given type of charge than ore hearths known heretofore.

Other objects will become apparent to those skilled in the art in the light of the following description and accompanying drawing.

In accordance with this invention, generally stated, a lead smelting unit is provided with a circular, rotating ore hearth, to which a pelletized mixture of coke and flue dust, and pelletized lead concentrate are fed automatically, independently, and in any desired relative order and rate.

In the preferred embodiment, feed bins are provided of a capacity to require their being filled only once in eight hours, although their absolute capacity is not a part of this invention. The feed bins are preferably fed by conveyors from raw material storage, so that substantially no manual labor is involved in the filling of the bins or feeding of the hearth.

The feed bins communicate with feeder rings, which rotate with the hearth. Adjustable feeder arms are arranged to sweep the pelletized coke and flue dust from one feeder ring and pelletized lead concentrate from the other ring.

A Newnam type rabbler is mounted in a fixed position relative to the smelter, with the hearth moving past it. In the preferred embodiment, the rabbler bar is hollow and fluid cooled, and is arranged to move transversely of its long axis, with the hearth, while the bar is in the charge and to be restored to its initial position as it leaves the charge, so as to reduce the drag of the charge on the bar and of the bar on the charge.

A Newnam type backing shovel is also provided. However, the backing shovel does not, in the embodiment shown, move laterally, and a separate spillage clearing mechanism is provided for moving any of the charge which has spilled over onto the fixed apron of the hearth hood, back onto the revolving hearth apron, whence it will be pushed back on the hearth charge by the backing shovel.

The hearth is provided with a section with a molten lead trap, and an automatic lead discharge arrangement which is adjustable to maintain a desired set of limits on the level of molten lead in the hearth.

Referring now to the drawing for an illustrative embodiment of this invention, reference numeral 1 indicates a smelting unit, which includes a feed system 200, a revolving hearth 300, a rabbling system 400 and an automatic discharge system 500.

In this embodiment, the smelting unit 1 has a structural steel skeletal frame 100, hexagonal in plan view, with six columns 101, suitably cross braced, supporting lintels 102, which in turn support heavy cross-beams 103. A hearth hood 3 is hung on the columns 101, within their compass. A large flue duct 4 communicates with the hood 3 and with a separator or precipitator, and stack, not here shown. The hood 3 has an outer circular vertical wall 5, with three rabbling openings 6, on 120° centers, a slag removal opening 7 beneath the flue 4, midway between two of the rabbling openings, an inner wall 8, and a sloping annular top 9. Other details of the hood will be described more completely hereinafter, when they can be related to other elements of the system.

Figures 6, 14:
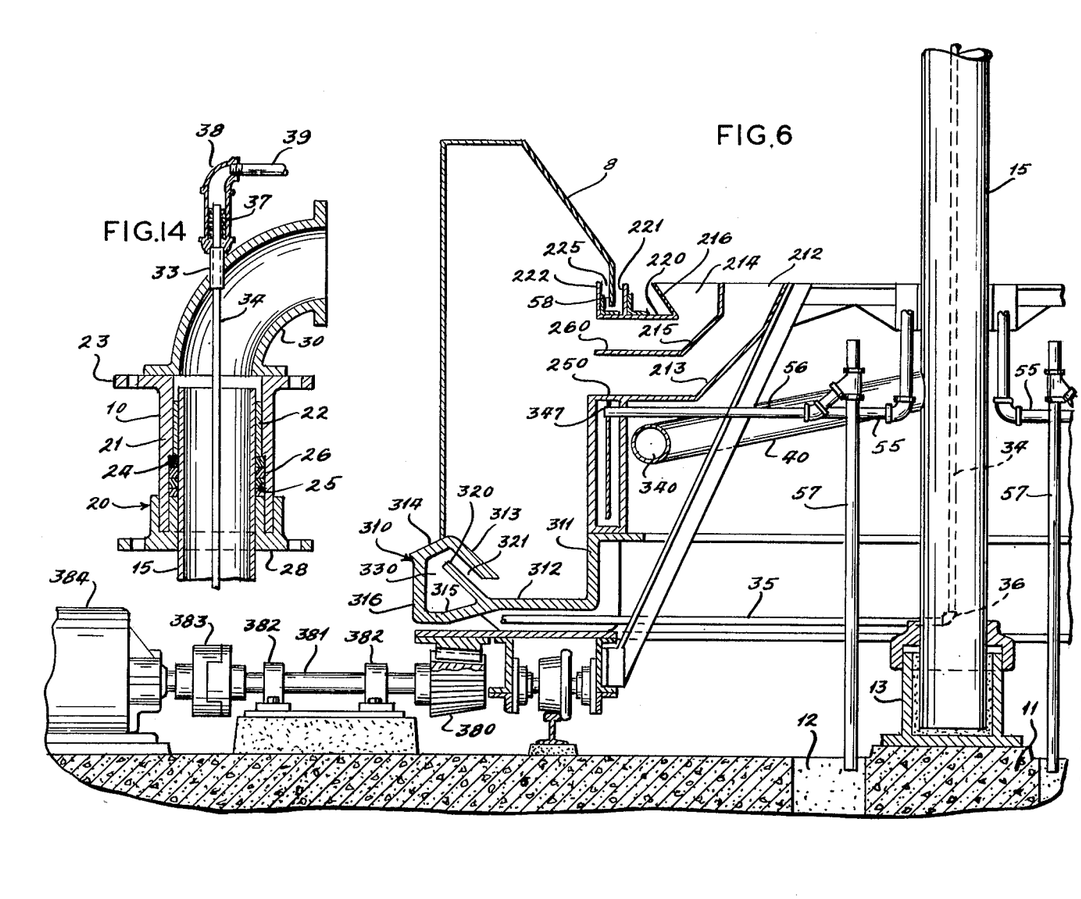
FIGURE 6 is another enlarged detail view of a part of FIGURE 4, showing a portion of the automatic discharge system and the drive mechanism for the revolving hearth.
FIGURE 14 is a fragmentary sectional view, taken along the line 14—14 of FIGURE 1.
Figure 7:
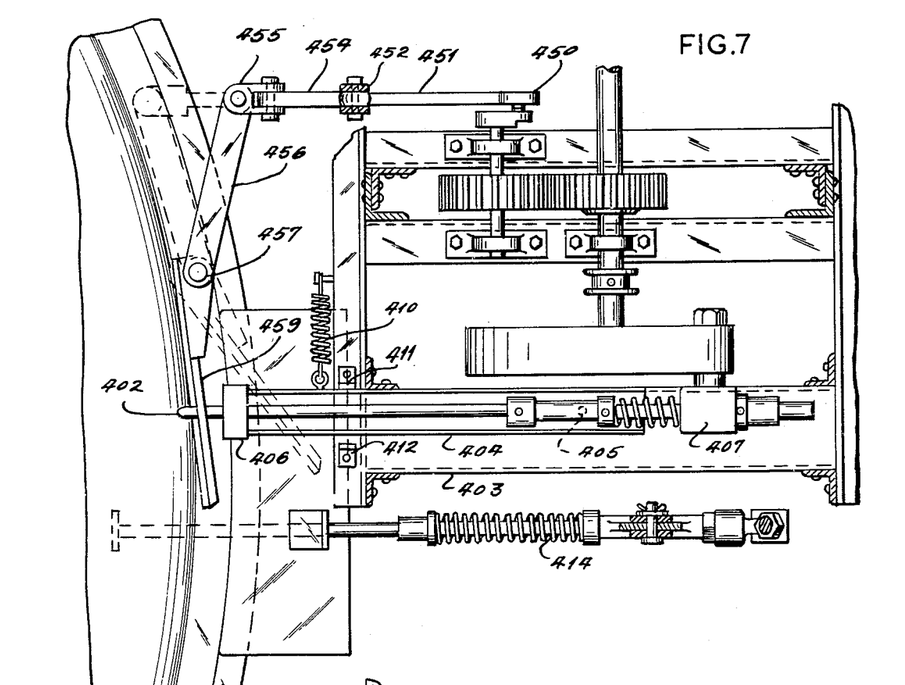
FIGURE 7 is a sectional view taken along the line 7—7 of FIGURE 5.
Figure 8:
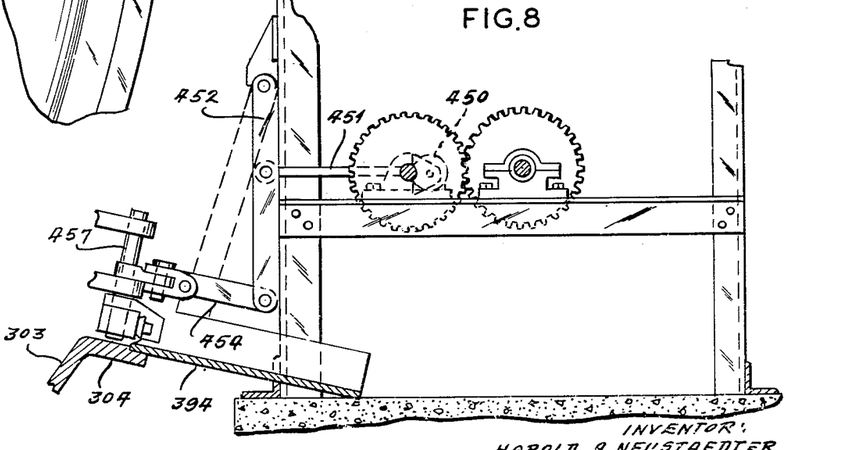
FIGURE 8 is a fragmentary side view of spillage clearing apparatus.

In the center of the frame, between and supported by two of the cross-beams 103, is a large bearing 10 shown particularly in FIGURE 14. Directly below the bearing 10 is a pedestal 11 around which is a sump 12, and upon which is a step bearing 13 (FIGURE 6). A main shaft 15, in the form of a heavy pipe closed at its lower end, is journaled at its lower end for rotation in the step bearing 13 and at its upper end in the bearing 10.

At its upper end, the shaft 15 extends through a packing gland 20 which, in the embodiment shown, is in part integral with the bearing 10. The bearing 10 has an outer sleeve 21 with an outwardly extending flange 23 at its upper end. Inside the sleeve 21, in about its upper half, is a bronze liner 22. The lower half of the inside surface of the bearing sleeve 21 is machined out to provide an internal shoulder 24 and an enlarged section 25 for the reception of packing 26.

A flanged gland seal 28 is tightened to hold the packing 26, by tie bolts, not here shown, extending through aligned holes in the flange on the gland seal and the flange 23 on the bearing sleeve.

An elbow 30, mounted on the bearing flange 23, communicates with the open end of the shaft 15. The elbow 30 is part of an air line, which is connected to a source of air under pressure, not here shown.

Figure 13:
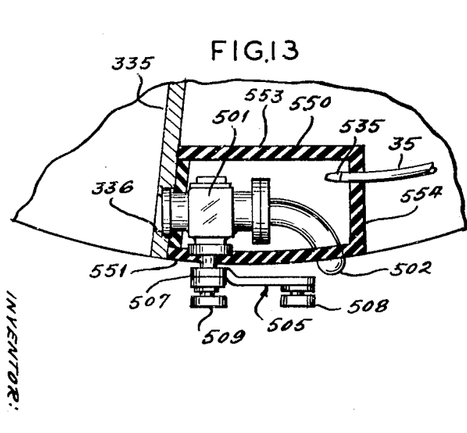
FIGURE 13 is a plan view in section of a portion of the automatic discharge system.

The wall of the elbow 30 is drilled to provide a hole which is directly above and aligned with the vertical center line of the shaft 15. A sleeve bearing 33 fits tightly in the hole, and a vertical gas pipe 34 extends down the center line of the shaft 15 with its upper end extending revolvably through the sleeve bearing 33. The upper end of the gas pipe 34 is revolvably mounted in a packing gland 37, and communicates with an elbow 38 and a gas line 39, connected to a source of gas or oil, not here shown. The lower end of the vertical pipe 34 is provided with an elbow 36 (FIGURE 5), and a lateral line 35, which extends through a seal in the side wall of the shaft 15, and connects with a small burner 535, which forms a part of the automatic discharge system 500 (FIGURE 13).

Figure 5:
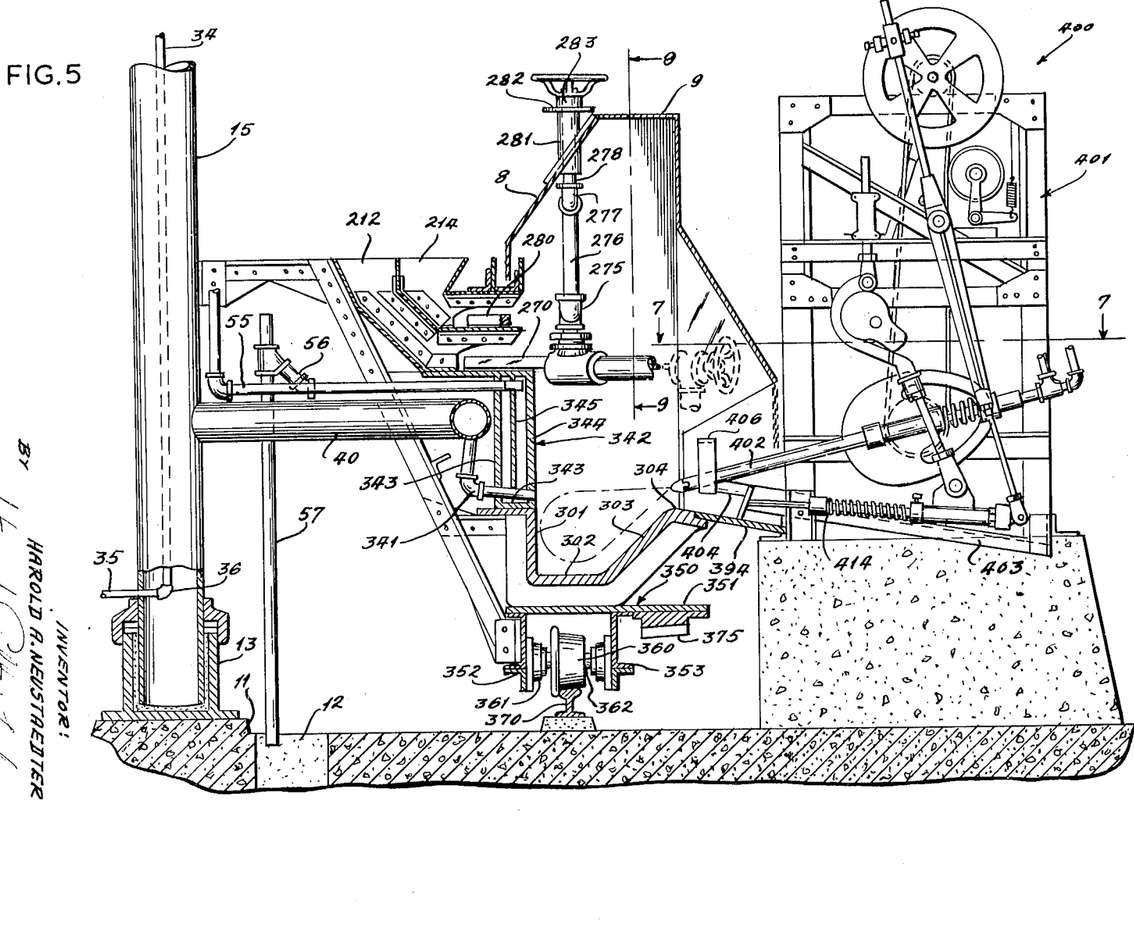
FIGURE 5 is an enlarged detail view of a part of FIGURE 4, showing a portion of the feed and rabbling systems and of the revolving hearth.

Below the axial center of the shaft 15, four manifold supply pipes 40 are connected to the shaft, so as to communicate with the interior of the shaft on 90° centers, at one end, and, at their other ends, with four hearth manifolds 340 (FIGURE 6). Two of the supply pipes, 180° apart, are connected to the shaft 15 at one level, and the other two, at another level, to avoid weakening the shaft unduly. Tuyeres 341 are connected to the hearth manifolds and extend through a water-cooled charge wall 342, to open immediately above the hearth 300 (FIGURE 5).

Figure 4:
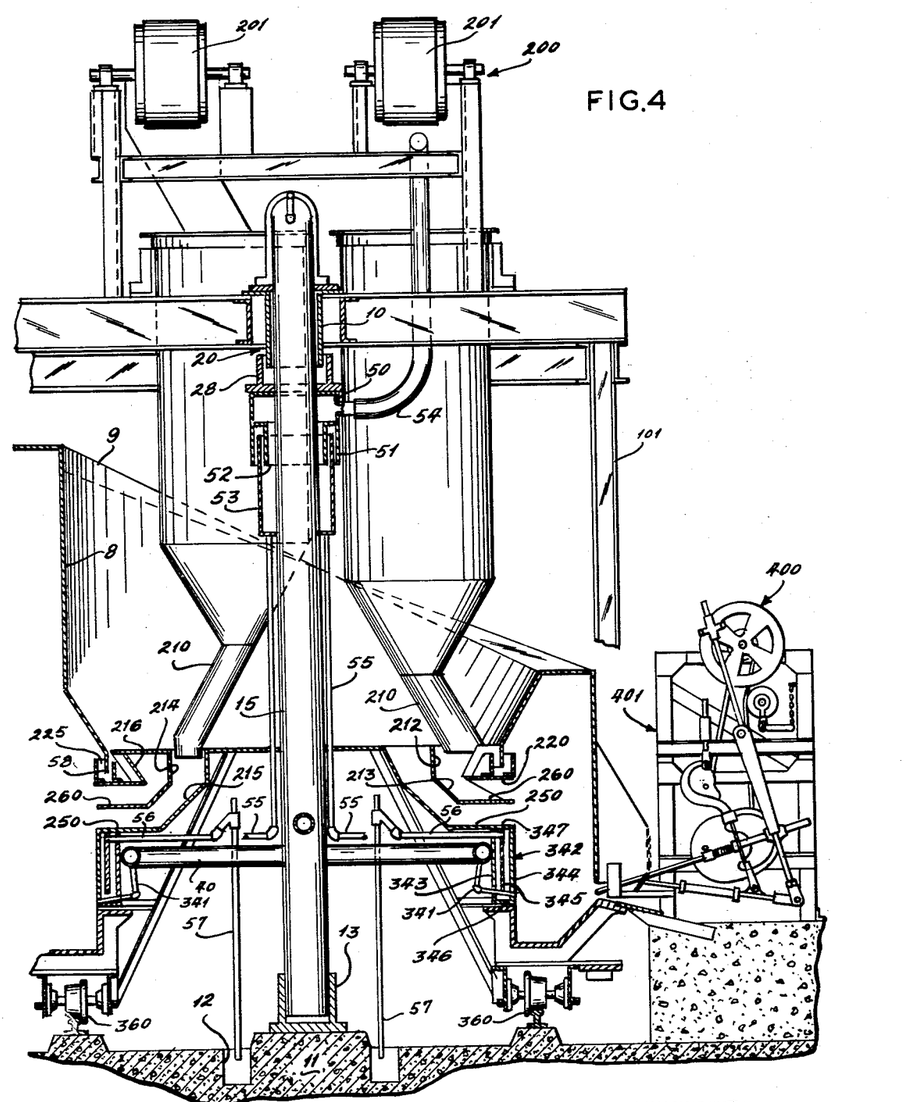
FIGURE 4 is a sectional view taken along the line 4—4 of FIGURE 1.

A water gland 50 (FIGURE 4) is secured to the underside of the gland seal 28. The water gland 50 surrounds the shaft 15, and is provided with inner and outer, spaced, depending walls 51 and 52, which define an annular, downwardly opening channel, loosely to receive the upper edge of a reservoir 53. The reservoir 53 encircles the shaft 15, and is water-tightly secured at its lower end to the shaft 15. A water supply line 54 is connected to the gland 50 to supply water to the reservoir 53. Cooling water supply pipes 55 are connected to the bottom of the reservoir 53. They extend down along the shaft 15 to a place about even with the top of the water cooled charge wall 342, thence radially to communicate with the top of an inner wall 343 of the charge wall 342. The charge wall 342 has a heavy outer wall 344, an inner annular baffle 345 and a bottom 346. A radially outer section 347 of a lower feed ring 250 serves as the top wall of the charge wall 342. The baffle 345 is secured to the underside of the top 347, and is spaced from the inside surface of the bottom 346. A water discharge pipe 56 is sealed into the baffle 345, communicating with the chamber defined by the baffle 345 and the inner surface of the outer wall 344. The discharge pipe 56 extends through the inner wall 343 and connects to an overflow pipe 57, which opens into the sump 12.

In the embodiment shown, there are eight water supply pipes 55 and discharge overflow pipes 56 and 57, although the number is not critical.

Figure 1:
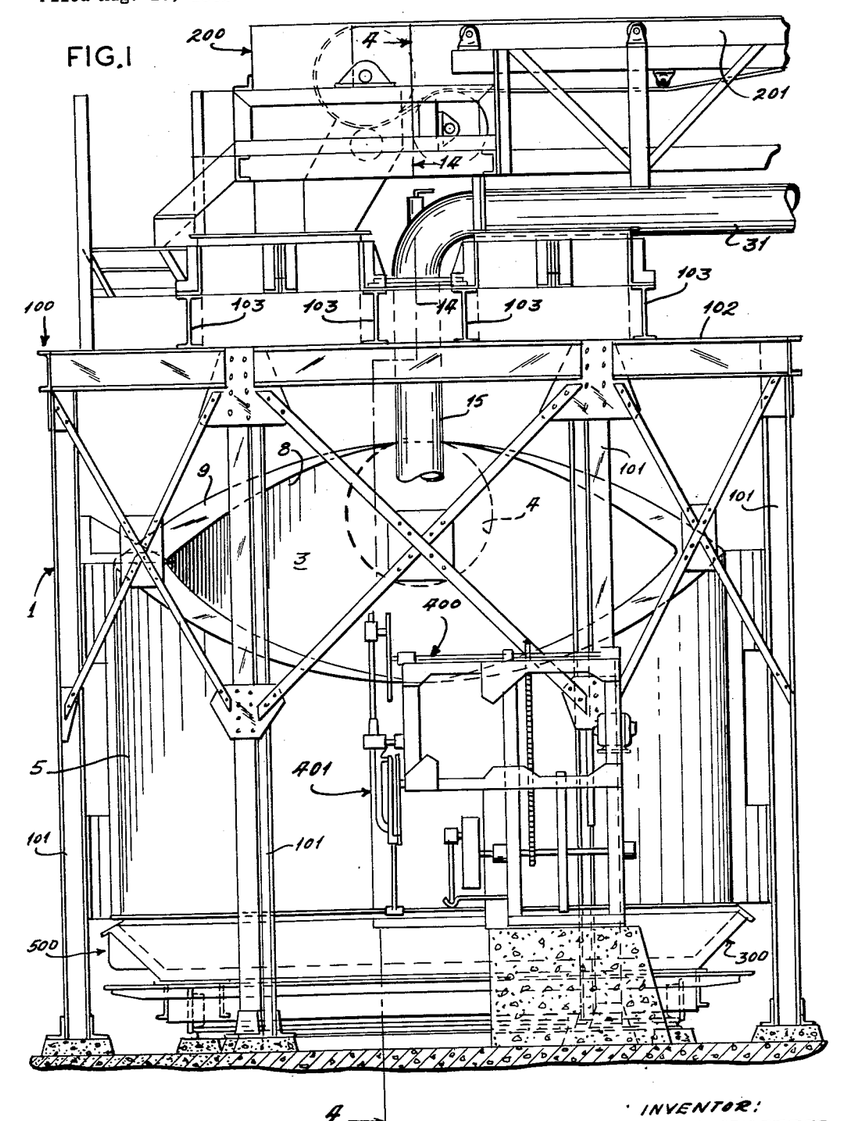
FIGURE 1 is a view in front elevation partly broken away, of an illustrative embodiment of lead smelting unit constructed in accordance with this invention.
Figure 2:
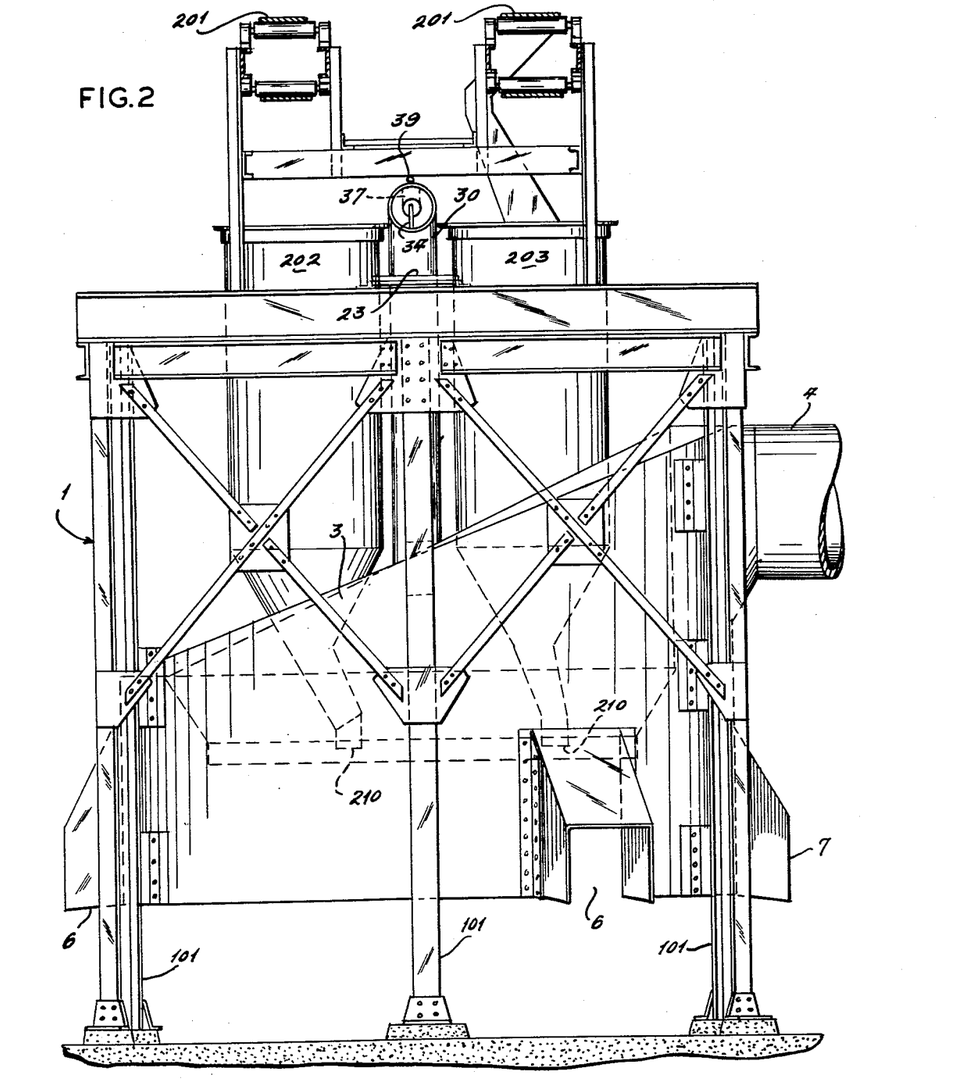
FIGURE 2 is a view in side elevation of the smelting unit of FIGURE 1 with the hearth and rabbling sections omitted.
Figure 3:
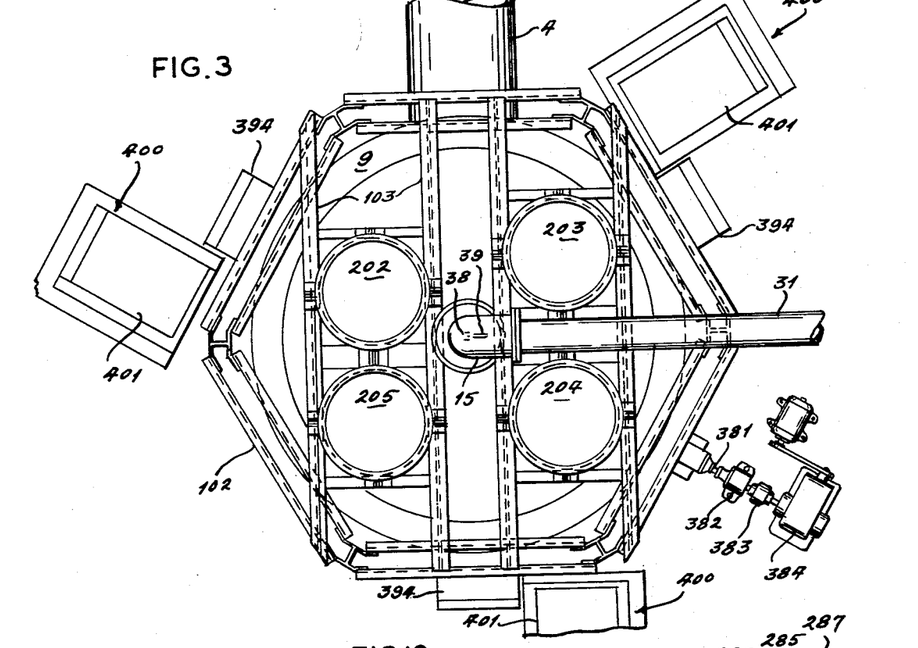
FIGURE 3 is a top plan view of the smelting unit without the conveyor system.

The feed system 200 includes belt conveyors 201, which are standard, and, in this embodiment, four feed bins 202, 203, 204 and 205 respectively (FIGURE 3). The feed bins are supported by two cross beams 103, within the compass of the inner wall 8 of the hearth hood, but they are not symmetrically arranged. Two of the bins are intended to receive pelletized ore (lead sulfide); the other two, a pelletized mixture of carbon (anthracite or coke breeze) and flue dust (lead oxide).

Suitable chutes extend from the conveyors 201 to the appropriate bins.

The bins are provided with discharge tubes 210, which open into annular feed receiving troughs, radially offset from one another. The inner trough 212 is intended to receive the pelletized coke and flue dust; the outer trough 214, to receive the pelletized lead concentrate. The feed receiving troughs 212 and 214 are open bottomed, and have a sloping inner wall 213 and 215 respectively, to lower feed ring 250 and upper feed ring 260 respectively.

As has been explained heretofore, the lower feed ring 250 is water cooled along its outer margin, and its position directly below the feed ring 260 serves to shield the upper feed ring 260 from the heat from the hearth 300.

The slope of the walls 213 and 215, and their spacing, serve to limit the amount and extent of outward spread of the material on the lower ring 250. A forward wall 216 of the trough 214 serves a similar function with respect to the feed from the trough 214 to the feed ring 260.

A flat annular plate 220 is secured to the forward wall 216. A pair of radially spaced upright bands 221 and 222 are secured to the plate 220, to define a channel 225 into which a skirt 58 of the inner wall 8 of the hearth hood 3 extends. In practice, the annular channel 225 is filled with fine ground barytes, and forms a seal between the hearth and the area of the hood above it, on the one hand, and the stationary elements of the feed system on the other.

The shaft 15, reservoir 53, water supply pipes 55, manifold supply pipes 40, manifolds 340 and tuyeres 341, charge wall 342, lower and upper feed rings 250 and 260 and troughs 212 and 214 all move as a unit, with the hearth 300. To this end, suitable bracing and connections are provided between the shafts, troughs and piping, on the one hand and a hearth carriage 350 on the other.

The hearth carriage 350, in the embodiment shown, includes a wide annular carriage plate 351, with heavy channels 352 and 353, radially spaced from one another, welded or otherwise secured to the underside at spaced intervals, to carry between each set of them a flanged wheel 360 (FIGURE 5). To this end, wheel bearings 361 are secured to the inside faces of the channels 352 and 353, in which the two ends of an axle 362, carrying the wheel 360, are journaled. The wheels 360, of which there are a multiplicity, ride on a circular track 370.

Outboard of the channels 353, near the outer margin of the underside of the plate 351, is a bevel gear 375, which extends all the way around the circumference of the plate 351.

A pinion 380 meshes with the bevel gear 375 (FIGURE 6). The pinion 380 is mounted on a shaft 381 journaled in bearing blocks 382, with a flexible coupling 383 at its end opposite the pinion 380. The flexible coupling is driven by a motor and speed reducer 384.

The hearth itself, in this embodiment, which is trough shaped, rests upon the top surface of the carriage plate 351. In this embodiment, the hearth is made up of eight segments, seven of which are identical, and the eighth of which is constructed to accommodate the automatic discharge system of this invention. The seven identical segments have a vertical back wall 301, a bottom wall 302, a sloping front wall 303, and an outwardly downwardly sloping hearth apron 304 (FIGURE 5). The eighth, discharge, segment 310 (FIGURE 6) has a back wall 311 and bottom 312 similar to the back wall 301 and bottom wall 302 of the remaining segments. A well extension 315 integral with the bottom 312 extends radially outwardly from and slightly below the level of the bottom 312. A vertical well wall 316 is integral, along its lower edge, with the well bottom wall 315, and, at its upper end is integral with the outside of the outer edge of a hearth apron 314, the upper surface of which corresponds exactly with the upper surface of the hearth apron 304 of the remaining segments. A sloping front wall 313 is integral at its upper edge with the hearth apron 314, but is spaced above and unconnected with the bottom 312. A well baffle 320, integral at its lower edge with the bottom 312 and extension 315 is substantially parallel with and spaced radially outwardly from the front wall 313 to define a passage 321. The baffle 320 terminates short of the underside of the apron 314 so as to leave an opening into a chamber 330 defined by the baffle 320, well wall 316 and well extension 315. It can be seen that the lower limit of the level of molten lead in the hearth will be determined by the height of the baffle 320. It can also be seen that in case of a shutdown, a conventional plug can be provided in one of the other sections, to permit the complete draining of the lead from the hearth.

The two ends of the chamber 330 are closed by end walls 335 extending from the vertical wall 316 to the exposed face of the front wall 313. In one of the end walls 335 is a port 336.

Fastened to the outside of the ported end wall 335, in communication with the port, is a cock type valve 501 with a stem 503. For reasons which will be explained hereafter, it is desirable that there be a wedge shaped collar welded or otherwise secured to the wall 335 between the wall and the valve, so as to orient the valve stem radially. A molten lead drain pipe 502 is connected to and communicates with the valve 501, and is positioned to discharge into a pig trough, not here shown, through a segment of the travel of the hearth, as explained hereafter.

The valve 501 is arranged to be fully open at one position, and fully closed at a position of its stem 90° from the fully open position. Mounted on the end of the valve stem, is a bell crank lever 505 with arms 506 and 507 extending at right angles to one another. The arms 506 and 507 carry rollers 508 and 509 respectively, at their outer ends. The valve body is enclosed within an insulating box 550, beneath the hearth apron and front wall of the contiguous hearth segment. The box 550 has an outside wall 551, with an opening through which the valve stem extends, a top 552, an inside wall 553 and an end wall 554. The box 550 constitutes a combustion chamber, in which gas from the line 35, extending through the wall 554 and issuing from the burner 535, is burned to maintain a temperature of the valve and lead discharge pipe 502 above the melting point of lead.

In an arc segment along which the pig trough runs, on a fixed base, a pair of cam rails 560 and 565 respectively are mounted. The cam rail 560 is so positioned that, as the valve bell crank arm 507 travels, if the arm 507 is vertical, which it normally is, to maintain the valve in closed position, the wheel 509 will engage the cam rail 560 and, with continued motion of the valve, will ride up on the cam rail 560 to move the bell crank lever to the position at which the arm 507 is horizontal, at which position the valve will be open. The valve will remain open until the valve reaches the cam rail 565, which is so positioned as to engage the roller 508 when the arm 506 is upright, and cause the arm 506 to be moved to the horizontal position, at which point the valve 501 is closed. The cam rail 565 is made adjustable circumferentially, so that it can be moved circumferentially toward or away from the cam rail 560, thus enabling the duration of the "valve open" period to be varied.

As has been explained heretofore, three Newnam type rabblers 401 are mounted on fixed foundations outside the compass of the hearth hood (FIGURES 4, 5, 7 and 8). The mechanism of the rabblers is conventional, except for the arrangement of the rabbler bar. In the device shown, a rabbler bar 402 is driven by the usual eccentric, with a lost motion connection and a heavy spring to prevent damage in case of jamming. The connection between the eccentric and the bar is made loosely through a coupling 407, to permit a limited amount of lateral movement of the inner end of the bar 402. For example, the bar end may be permitted 4 inches of the lateral movement. A channel iron 403 is fixed to the base of the rabbler, and another, guide, channel 404 is pivoted to the channel 403, on a pintle 405. A yoke 406 is mounted on the end of the guide channel 404, and the bar 402 extends through the yoke 406. Means, in the form of a spring or a gravity biased weight, are provided for biasing the guide channel 404, hence the yoke 406, and the bar 402 to a neutral, initial position as the rabbling bar is withdrawn from the charge. In the embodiment shown, the biasing means are shown somewhat diagrammatically as a spring 410. Stops 411 and 412, on either side of the guide channel 404, limit the amount of lateral movement permitted the guide channel, hence the bar.

A conventional backing shovel 414 is provided. It can be seen that, since the backing shovel is not adapted to lateral movement, and is of limited width, spillage of charge on the fixed hearth hood apron in an area circumferentially beyond the reach of the backing shovel will be entirely wasted. Accordingly, a spillage clearing device, for pushing charge which has been spilled onto a fixed apron 394 of the hood, is provided.

In this embodiment (particularly FIGURES 7 and 8), the spillage clearing apparatus includes an eccentric 450 driven by gearing connected to and coordinated with the rabbler bar drive, and a pitman 451, connected to a lever 452, pivoted at its upper end to a fixed bracket and, at its other end to a link 454. The link 454 is connected to a knuckle 455, pivoted to one end of an arm 456, connected to a pin 457, journaled in brackets, and to which a clearing bar 459 is connected at one end. The arrangement of lever 452 and pin 457 are such, as can readily be observed, as to permit adjustment of the extent and position of the throw of the clearing bar 459, by clamping the bar 459 at different positions with respect to the pin, and by connecting the pitman 451 to the lever 452 at different vertical spacings with respect to the upper pivot of the lever 452.

The charge material which is piled on the feed rings 250 and 260 is swept into the hearth by feeder arms which are adjustable both in the distance in which they extend toward the troughs 212 and 214 and also in their elevation. In the embodiment shown, a lower feeder arm 270 extends into material sweeping relation with the lower feed ring 250, and an upper feeder arm 280 extends into similar relation with the upper feed ring 260.

Figures 9, 10:
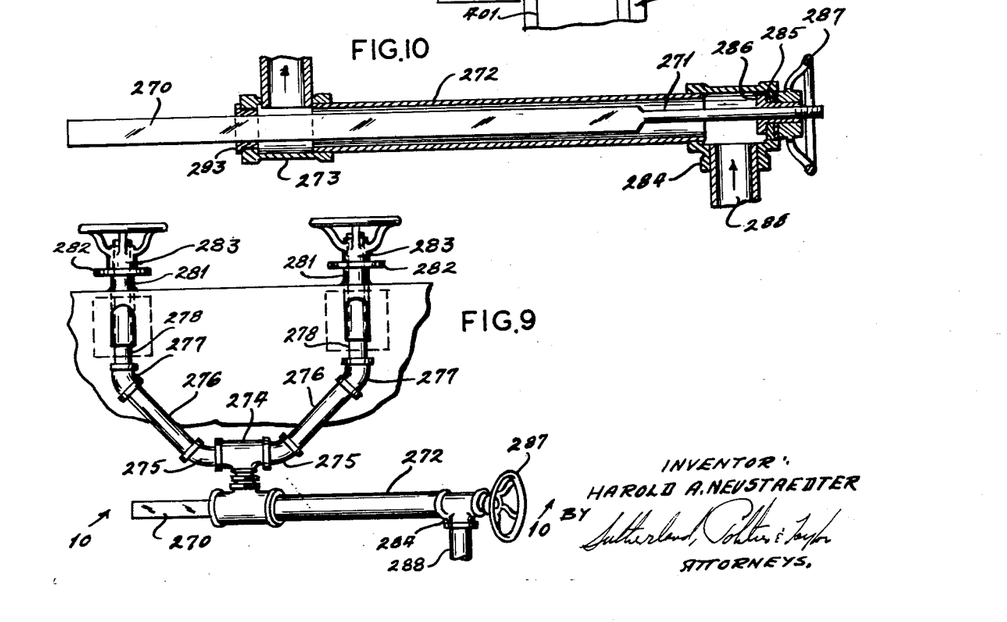
FIGURE 9 is a sectional view taken along the line 9—9 of FIGURE 5.
FIGURE 10 is a detail sectional view taken along the line 10—10 of FIGURE 9.
Figure 11:
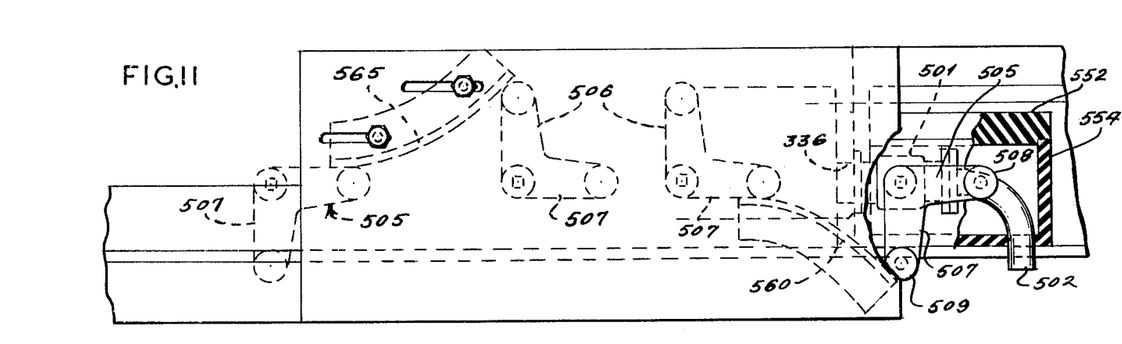
FIGURE 11 is a detail view in side elevation partly broken away of a portion of the automatic discharge system.
Figure 12:
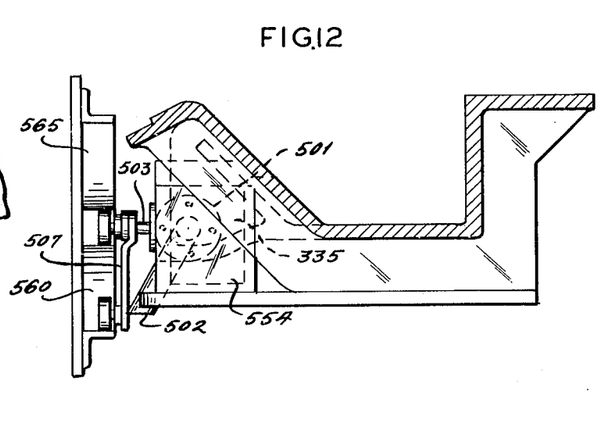
FIGURE 12 is a view in end elevation of a portion of the automatic discharge system.

In the embodiment shown, the feeder arms 270 and 280 are supported and cooled by means of a simple but effective structure, illustrated particularly in FIGURES 9 and 10. The feeder arms themselves consist of square bars with the outer end turned round and threaded externally. Through most of the length of the square bar, the bar is within a housing 272, which in this instance is a heavy pipe, provided with a T 273 at its inner end, which is closely adjacent the outer margin of the feed ring. A bushing 293 with a rectangular opening in it is provided in the outer end of the T 273, to prevent rotation of the feeder arm and provide support for the arm. The stem of the T 273 is directed upwardly. In the embodiment shown, there is a nipple in the stem of the T 273, to which the downwardly directed stem of a T 274 is connected. A pair of 45° street L's 275 are connected to the T 274 and a pair of upwardly diverging pipes 276 with 45° elbows 277 at their ends are connected to the L's 275. The mouths of the elbows 277 are directed vertically upwardly, and a pair of adjusting pipes 278 are connected thereto. The adjusting pipes 278 are threaded through a considerable portion of their length at their upper ends. They extend slidably through sleeves 281 which are welded or otherwise secured to the inner wall 8 of the hood and extend through the hood and above the top 9. Suitable reinforcing and bracing means may be provided on the hood to give strength to the sleeves 287. At the top of the sleeve 281 is an annular outwardly extending flange 282. A handwheel with an internally threaded hub 283 is threaded on the upper end of each of the pipes 278, to permit the pipes to be raised and lowered relative to the sleeves 287. The arrangement of spaced separate adjusting arms, gives bracing against side displacement of the housing 272, and, therefore, of the feed bar. The adjusting pipes 278 are open at their upper ends.

At the outer end of the housing 272, is another T 284, with its stem at right angles to the housing. The threaded end of the stock 271 extends outwardly, through and beyond the T 284, through an inwardly extending stop ring 285 in the outer end of the T. An internally threaded bushing 286 is revolvably mounted within the stop ring. The bushing 286 has a flange on its inner end, is threaded on the stock 271, and is positioned with its flange against the inside of the stop ring 285. A handwheel 287 with a bored hub is pinned or otherwise mounted on and around the bushing 286, with the inner face of its hub contiguous the outer face of the stop ring 285. It can been seen that rotation of the handwheel 287, hence the bushing 286, will cause the feed bar to move in or out as the case may be. An air line 288 is connected to the stem of the T 284, at one end, and to a source of air, not here shown, at the other. Alternatively, the T 284 can be left open, and the natural draft flow of air through the piping terminating with the pipes 278, and resulting from the stack effect as the piping above the housing is heated more than the outer part of the housing, can be relied upon. There is a considerable space left between the inside wall of the housing 272 and the feeder arm bar, to permit the free passage of the air through the housing 272 and out through the two adjusting pipes 278, to cool the bar. The bar 270 is resting on or is only slightly above the water cooled margin of the feed ring 250. The feeder arm 260 is to some extent protected, as is the feed ring 250, by the baffle effect of the feed ring 250, and both feeder arms are cooled to some extent by the material being swept off the feed rings by the feeder arms.

The general arrangement of both the upper and lower feeder arm supports and the feeder arms themselves is identical. The only difference is that the "diagonal" pipes 276 in the upper feed bar assembly are shorter, and the adjusting pipes 278 are longer, so that the pipes 278 of the upper assembly are positioned intermediate the pipes 278 of the lower feeder arm assembly.

The upper and lower feeder bars are introduced from the same side (away from the direction of rotation) of the rabbler opening, at different angles. The lower feeder arm 280 extends across the axis of the rabbler bar, and sweeps the pelletized carbon and fume or flue dust into the hearth just before the hearth charge is rabbled. The upper feeder arm extends over the feed ring 260 on the opposite side of the rabbler bar axis, and is so positioned that the pelletized concentrate is swept by the upper feeder arm onto the charge after the back shovel has thrown up a ridge on the surface of the charge, that will hold the lead concentrate near the water jacket charge wall 342.

The positions of the four feed bins 202–205, in the embodiment shown, are determined by the positions of the rabbling stations. In order to make it feasible to use four bins, with three rabbling stations, it is preferred to use the arrangement shown in FIGURE 3, in which the bins 202 and 203 are relatively close together and are both between two of the rabbling stations. As can best be determined from considering FIG. 4, the feed bin 202 contains pelletized flue dust and carbon, and feeds to the lower feed ring 250, while feed bin 203 contains pelletized concentrate, and feeds to the upper feed ring 260. Feed bin 204 is positioned by itself between two rabbling stations, and contains pelletized concentrate. Feed bin 205 contains pelletized carbon and flue dust and is positioned intermediate the other two rabbling stations. It can be seen that, while the positions indicated provide a preferred arrangement, since they give room for the cross beams 103 and flue 4, and fit in well in general, their position is not an essential part of the invention, since during the invention, since during the travel of any section of the feed rings between successive tanks supplying the feed to a particular ring, the feed rings will be supplied by the material in the troughs 212 and 214. The amount of feed carried by the rings which is swept into the hearth charge at each feeder arm station is limited by the angle of repose of the charge, since only the material within the reach of the feeder arms will be swept off the rings. Therefore, by suitably proportioning the troughs, feed rings and the walls limiting the feed to the rings, an ample and constant supply of feed can always be maintained in the troughs between bins.

The feeder arms ought ideally to be just brushing the feed rings, but not dragging thereon. Their vertical relationship to the feed rings is adjusted by means of the handwheels 283. The amount of feed of both kinds swept onto the hearth, is, of course, determined by the inward and outward adjustment of the feeder arms, by means of the handwheels 287.

In operation, the feed bins are filled with the proper materials, the flow of water through the reservoir 56 and various piping is begun, the gas to the automatic discharge system is ignited, to bring the valve temperature to the desired height, a suitable bed of coals is prepared in the hearth, to heat the hearth to the desired temperature, and the hearth drive is started. The charge will begin to feed automatically as the rings, bearing their respective materials, move past the feeder arms. The air to the tuyeres is turned on at the appropriate time. Ordinarily, in operation the hearth charge slopes from a point close to the top of the charge wall 342 to the inner edge of the hearth apron 304.

The preferred method of feeding, as has been indicated, is to sweep the pelletized carbon and fume onto the hearth charge just before the charge is rabbled. The ignition temperature of the carbon (usually anthracite or coke) is about 500° C. The temperature of the material on the feed ring is not likely to reach within a hundred degrees of ignition temperature, so that the feed from the lower plate 250 is not expected to ignite until it is past the rabbling point. The pelletized concentrate is then fed to the charge in the hearth after the back shovel has thrown up a ridge that will hold the concentrate near the charge wall 342. This will permit the concentrate to heat and partially oxidize, in the period between the time it is fed to the charge and the next rabbling station, so that when, at the next rabbling station, it is mixed with the pelletized fume there will be a quick reaction and reduction. The molten lead will accumulate in the bottom of the hearth, and will reach a level within a few inches of the top of the apron 304, throughout the hearth. As has been explained heretofore, when the valve 501 on the well segment of the hearth reaches the cam rail 560, the valve will be opened, permitting the molten lead to drain off through the valve 501 and discharge tube 502, into a suitable elongated trough. The trough may discharge into a heated storage kettle in a refining section, from which the lead may be pumped to refining kettles or to molds to make pigs for later refining. The arrangement of the baffle 320 is such as to preclude the reducing of the level of molten lead below the desired height, so that there is no danger of overdraining, cooling the hearth and causing difficulties in the reduction. In any event, the adjustment of the closing cam rail 565 will permit the maintenance of the level of molten lead within desired limits.

Simply by way of illustration and not by way of limitation, the smelting unit of this invention may be made with a hearth 8½ feet in diameter measured from the back wall 301 of the hearth. The hearth from the inner wall to the outer lip of the apron, may be about 2 feet wide. The shaft 15 can be made of 10 inch extra heavy pipe approximately 16 feet or more high. The bins can be of 58 cubic feet capacity or more. The feeder arms can be 2 inch square bars, and the housing 272 can be 3½ inch pipe. The manifold supply pipes 40 can be 4 inch pipe, feeding one inch tuyeres, spaced on 6 inch centers. The rabble bar can be 1⅝ inch tubing with a ⅝ inch bore, with a ⅛ inch tube extending to a point near the tip, within the bore, to permit fluid cooling of the bar. A cobalt insert is welded into the end of the rabbler bar. The hearth should move at such a rate that the charge is rabbled (or moved past the rabbler bar) at the rate of 4 feet per minute, measured at the inside wall 301. However, it can be seen that, depending upon the operation, the speed of the hearth may be considerably increased.

Numerous variations in the construction of the apparatus of this invention, within the scope of the appended claims, will be apparent to those skilled in the art in the light of the foregoing disclosure. For example, the valve 501 may be electrically or otherwise differently operated although the mechanical method shown and described has advantages of simplicity and dependability over other methods. More than one well segment, with separate valves, may be provided in the hearth, or several lead discharge stations with valve opening and closing means at each, can be provided. The hearth has been referred to as "circular." Actually, the segments in the embodiment shown form an octagonal outline, and depending upon the number of segments employed, the shape can be that of any substantially regular polygon, as long as the clearance and distance with respect to the rabblers are within operative limits. The term "circular" is used broadly to indicate a closed annular hearth the trough of which is so nearly circular in plan as to permit effective rabbling of each segment of the charge from a fixed station as the hearth rotates.

Various other drives for the hearth and clearing bar and various arrangements of linkages for the latter mechanism can be used. It can be seen that the order of feed, particularly with different kinds of charge or conditions of operation, can be varied. For example, at any or all of the rabbling stations the concentrate may be fed ahead of the rabbler bar with respect to the rotation of the hearth instead of behind it, and either simultaneously with or before the carbon-fume pellets and the carbon-fume pellets can be fed behind the rabbler bar instead of ahead of it. The feeding of the concentrate from the upper ring is preferred because it is stable at higher temperature than the carbon-fume mixture, and the temperature of the upper ring is likely to be somewhat higher than the water cooled lower ring, but under some conditions, it may be desirable to feed different material from the two rings. It may even be desirable to provide one or more additional feed rings, for a three or more component feed system or to provide greater flexibility in feeding two components.

Having thus described the invention, what is claimed and desired to be secured by Letters Patent is:

1. A lead smelting unit comprising a revolving circular hearth having at least one well segment; automatic lead discharge means connected to said well segment, said lead discharge means comprising a valve connected to a well in said well segment, means for opening and closing said valve at predetermined intervals and for a predetermined length of time in a predetermined location with respect to the travel of said hearth, and discharge mechanism heating means for maintaining the temperature of said valve above the melting point of lead; a plurality of rabbling stations, at fixed positioning, about the perimeter of said hearth, the location of said lead discharge location being intermediate successive rabbling stations; automatic rabblers, at each of said stations, having rabbling bars adapted to extend into said hearth; a plurality of feed rings above said hearth and connected to rotate therewith; troughs communicating with said feed rings and rotating therewith; fixed feed bins communicating at spaced points with said troughs, said troughs being of a capacity to carry a sufficient supply of feed material to supply said feed rings between the points at which said troughs communicate with said feed bins; feeder arms extending from beyond the outer margin of said hearth to a position above and in charge-sweeping relation to said feed rings, adjacent each of the said rabblers; and power means connected to rotate the said hearth and said feed rings.

2. A lead smelting unit as defined in claim 1 and further comprising a circular hearth having a plurality of segments at least one of which segments is provided with automatic molten lead tap-off means, said tap-off means comprising a molten lead well communicating with the interior of said hearth, a valve communicating with said well, means for heating said valve above the melting point of lead, valve control means arranged to open and close said valve in succession in response to relative movement between said valve and said valve control means, and power means for imparting relative movement between said valve and said valve control means.

3. A lead smelting unit comprising a circular hearth, two feed rings, one above another and both above said hearth one for receiving a mixture of carbon and high oxide lead and the other for receiving lead concentrate, a lower feeder arm immediately above and in sweeping relation to said lower feed ring, and an upper feeder arm immediately above and in sweeping relation to the upper of the two feed rings whereby separate charges may be fed from the said two feed rings to said hearth, an automatic rabbler mounted at a fixed station, with a rabbler bar adjacent said feeder arms, and means for rotating the hearth and feed rings relative to the feeder arms and rabbler to effect charging of said hearth, and a subsequent mixing.

4. The smelting unit of claim 3 including means for moving said feeder arms toward and away from said feed rings.

5. The smelting unit of claim 3 including a backing shovel positioned on the side of the rabbler bar away from the direction of rotation of the hearth, said backing shovel being arranged to form a ridge on a charge in said hearth, and wherein one of the feeder arms is positioned with respect to its contiguous feed ring and with respect to the backing shovel so as to sweep feed from the feed ring onto the hearth charge above said ridge.

6. The smelting unit of claim 3 wherein each of the feeder arms is provided with a housing through a major portion of its length to form an air conduit about said arm, means are provided for circulating air through said housing, and means are provided for adjusting the length of said feeder arm extending into sweeping relation to its feed ring.

7. A lead smelting unit comprising a revolving circular hearth; a feed ring above and rotatable in the same direction as said hearth, a feeder arm immediately above said feed ring and in material sweeping relation thereto; an automatic rabbler having a rabbler bar positioned to move into and out of a charge in said hearth on the side away from the approaching side of the feeder arm when said hearth and said ring move together past said arm and said rabbler bar consecutively, said feeder arm and said rabbler being fixedly mounted against rotation whereby said feeder arm sweeps material off said ring onto said hearth and the material is thereafter mixed by said rabbler, joint means connected to said rabbler bar to permit limited lateral movement of said bar from an initial position, in response to the relative movement between the hearth and rabbler when the rabbler bar is within the charge in the hearth, and means for biasing the bar to said initial position as the bar emerges from said charge.

8. The smelting unit of claim 7 wherein a backing shovel is provided which moves substantially planarly and spillage clearing means are provided, between the rabbler bar and backing shovel, for moving spilled charge onto an apron on the rotating hearth, into the path of the shovel.

9. A lead smelting unit comprising a rotating circular hearth; two rotating feed rings moving in the same direction as said hearth, one above another and both above said hearth; means for feeding mixed carbon and high oxide lead charge to one of said feed rings; means for feeding lead concentrate to the other of said feed rings; a stationary rabbling station at which a rabbler is arranged to project a rabbling bar into a charge in the said hearth; feed means positioned to move a measured amount of mixed carbon and high oxide lead charge from the one of said feed rings into the said hearth on the approaching side of the rabbler bar and other feed means positioned to move a measured amount of lead concentrate from the other of said feed rings into the said hearth on the leaving side of the rabbler bar whereby the said mixed carbon and high oxide lead charge is rabbled before the lead concentrate charge is fed to said hearth.

10. The smelting unit of claim 6 wherein means are provided for moving each feeder arm and its housing vertically with respect to the ring with which it is in sweeping relation.

11. A lead smelting unit comprising a rotating circular hearth, two feed rings, one above another and both above said hearth; a feed bin containing pelletized carbon and oxide-rich lead charge and adapted and arranged to discharge said pelletized carbon and oxide-rich pellets on one of said rings; a second feed bin containing pelletized lead concentrate and adapted and arranged to discharge said concentrate on the other of said rings; a stationary rabbling station at which a rabbler is arranged to project a rabbling bar into a charge in the said hearth; feed means positioned to move a measured amount of pelletized carbon and high oxide lead charge from the feed ring on which it is, into said hearth on the approaching side of said rabbler bar, and other feed means positioned to move a measured amount of pelletized lead concentrate from the feed ring on which it is, into said hearth on the leaving side of the rabbler bar.

References Cited in the file of this patent
UNITED STATES PATENTS

| | | |
|---|---|---|
| 838,741 | North | Dec. 18, 1906 |
| 2,018,242 | Schlippenbach | Oct. 22, 1935 |
| 2,070,910 | MacMichael | Feb. 16, 1937 |
| 2,093,018 | Newnam | Sept. 14, 1937 |
| 2,211,932 | MacMichael | Aug. 20, 1940 |
| 3,028,874 | Burkett | Apr. 10, 1962 |